Jan. 19, 1971 G. E. BURNHAM, SR 3,555,819
BAFFLE STRUCTURE AND FLOW DISTRIBUTOR FOR A DEGASSING APPARATUS
Filed May 17, 1968
2 Sheets-Sheet 2

INVENTOR
GERALD E. BURNHAM, SR.

BY
Irons, Birch, Swindler & McKie
ATTORNEYS

United States Patent Office 3,555,819
Patented Jan. 19, 1971

3,555,819
BAFFLE STRUCTURE AND FLOW DISTRIBUTOR FOR A DEGASSING APPARATUS
Gerald E. Burnham, Sr., 2000 W. St. Mary Blvd., Lafayette, La. 70501
Filed May 17, 1968, Ser. No. 730,124
Int. Cl. B01d 19/00
U.S. Cl. 55—170
12 Claims

ABSTRACT OF THE DISCLOSURE

An apparatus for use in the degassification of drilling mud including a vacuum tank having a new and improved baffle arrangement comprised of a pair of baffle means on opposed sides of an elongated mud overflow container, each of said baffle means being comprised of a plurality of baffle layers, said layers being made up of individual baffle plates extending transversely of said elongated container and being spaced longitudinally of said container.

BACKGROUND OF THE INVENTION

Field of the invention

This invention relates to an apparatus for use in the degassification of drilling muds. More particularly this invention relates to a new and improved drilling mud degassification apparatus for use in a drilling mud recirculation system at the well head, including a vacuum tank having a new and improved baffle structure and mud distributor for maximum distribution of the drilling mud into thin layers whereby entrained gas may be removed from the drilling mud.

The state of the prior art

It is customary to circulate a drilling mud through a well bore and around the drill bit during a drilling operation of the nature of that associated with the drilling of wells for gas and oil. The drilling mud, ordinarily an aqueous suspension of solid material, performs numerous well-recognized functions such as lubricating and cooling the drill bit and stem, and serving as a carrier to withdraw drill cuttings and said from the well. In addition, the mud provides a pressure head in the well bore which prevents the escape of gas from the well.

During the drilling operation, the drill penetrates numerous rock formations, some of which may contain gas at an extremely high pressure. This gas would enter the well bore if not counteracted by the pressure of the column of drilling mud in the well bore. In order to properly control the escape of such gases, it is necessary to maintain the drilling mud at a predetermined density relative to the anticipated pressures to be encountered in the drilling operation.

As the drilling mud is pumped through the well bore, gas becomes entrapped within the drilling mud. A decrease of density of the mud and therefore a decrease in the pressure effected by the mud column results from such entrapped gas. Such a reduction in pressure may result in "kicking," a repeated and rapid rising and lowering of the drill stem or jarring of said stem or a complete "blow out" of the well. Entrapped gas also increases the viscosity of the mud, thereby imposing a greater load on the pumping apparatus increasing pump wear and facilitating system overload and failure.

In order to remove the entrapped gas from the drilling mud, the prior art assemblies often employ some type of baffle arrangement within a vacuum tank in order to spread the drilling mud into extremely thin layers in an environment of reduced pressure causing the bubbles of entrapped gas to be drawn from the mud. Certainly, gigantic baffle plates could be employed for spreading the mud into extremely thin layers and maintaining the mud in such thin layers for sufficiently long periods that a substantial extraction of the entrapped gas from the mud could be effected. Logically, however, there are practical limitations upon the size of the degassing tanks which can be employed at the well head stemming from such factors as: the space available at the well head, the production costs of such degassing tanks, and the size vacuum pump required for maintaining the interior of the tank at a desired pressure level. Thus, the size of the degassing tank must be maintained within practical limits while providing for the maximum distribution of gas-laden mud into extremely thin layers and maintaining the gas-laden mud in such layers for a time sufficient for substantial removal of entrapped gas.

Numerous problems have been encountered in providing controlled distribution of mud to baffle structures in a vacuum tank. As a partial answer, various prior art assemblies have provided gas-laden mud distributors comprised of shallow troughs. While these trough structures provide a degree of distribution of the mud to various forms of baffle structures, the flow of mud onto the plates is normally uneven and, thus, the amount of degassification obtained is reduced and is relatively unpredictable. This unpredictability inhibits the controlled replenishment of mud to the system required to maintain the necessary pressure in the well bore to prevent "kicking," "jarring" or "blow outs."

SUMMARY OF THE INVENTION

This invention encompasses an apparatus for use in the degassification of drilling mud. This apparatus includes a degassification tank with means coupled for drawing a vacuum in the interior chamber of said tank. A baffle means is provided within the degassification tank including at least one baffle layer with said layer being comprised of a plurality of baffle plates. The individual baffle plates are inclined relative to the horizontal to thereby define upper and lower surfaces and edges. These inclined baffle plates are disposed in a substantially overlying relation whereby the upper edge of a baffle plate overlies the upper surface of its adjacent baffle plate with the upper and lower edges of said plates spaced from one another.

While only a single baffle layer may be utilized, it is of course, extremely desirable to employ a plurality of baffle layers so that the gas-laden mud will be maintained in thin layers for a maximum period of time. The aforedescribed baffle arrangement is particularly adaptable for use in a plurality of baffle layers. In such a stacked baffle structure, the baffle plates of alternate layers are reversely inclined with the upper surfaces of the baffle plates of an underlying layer positioned beneath the lower edges of the baffle plates of an overlying layer respectively. In this manner, the gas-laden mud flowing down the upper surfaces of the plates of the upper overlying baffle layer will flow down from the lower edges of said baffle plates and onto the upper surfaces of the baffle plates of the adjacent underlying layer and thence downwardly along a circuituous path through the plurality of baffle layers.

In addition, means is provided within the degassing tank for distributing the gas-laden drilling mud onto the upper surfaces of the baffle plates. As disclosed herein, it has been found to be particularly advantageous to provide a centrally located, elongated, mud overflow container defined by side, end, and bottom walls and having an open top. A mud inlet is provided at the bottom portion of said container so that the mud flows evenly and upwardly through the container and evenly overflows at least one of the side walls of said container. The baffles may be positioned on opposed sides of such a container with the plates extending transversely of the container and spaced longitudinally of said container.

It is an important object of this invention to alleviate the aforementioned difficulties in the art by providing a new and improved apparatus for the degassification of drilling mud wherein a large quantity of entrapped gas may be effectively and efficiently removed from the mud as the mud is being circulated to and from the well head.

As a further object of this invention, I have provided such an apparatus including a new and improved baffle arrangement where a maximum distribution of the gas-laden mud into extremely thin layers may be effected while maintaining the size of the degassification tank within practical limits.

It is also an object of this invention to provide such a baffle arrangement whereby the surface over which the gas-laden mud is distributed can be materially expanded with only a minimum increase in the overall size of the degassification tank.

Another object of this invention is to provide a new and improved distribution means for evenly distributing the gas-laden mud onto the baffle plates to thereby obtain maximum and controlled distribution of the gas-laden mud over the baffle plates.

In addition, it is an object of this invention to provide such a degassification apparatus having a degassed mud evacuation means capable of handling with ease the quantity of drilling mud normally circulated to and from the well head.

It is a further object of this invention to provide such an evacuation means for the degassed mud including both a drilling mud ejector and a centrifugal pump which may be operated separately to insure a continuous evacuation of mud even though one of the pumps may fail, and also which may be operated in combination in such a manner that the ejector pump always maintains the centrifugal pump in a primed condition.

It is also an object of this invention to provide such a degassification apparatus in combination with a reciprocating vacuum pump for drawing a vacuum from the degassification tank through an outlet conduit.

In addition, it is an object of this invention to provide such a degassing apparatus having a float valve means within the degassification tank responsive to the level of degassed mud in a mud receiving area to open and close a valve in order to vent the gas outlet line to the atmosphere and thereby increase the pressure within the degassification tank.

Another object of this invention is to provide a tank system for retention of degassed and gas-laden mud whereby overflow of the tanks is materially inhibited by a mud equalization means between said tanks, said equalization means also providing for the dilution of gas cut mud by degassed mud before passage of the gas cut mud through the degassing tank.

Other objects and advantages of the novel features of this invention will become apparent from the following description taken in connection with the accompanying drawings wherein an embodiment of this invention is set forth by way of illustration and example. It is, however, expressly understood that the drawings are for the purpose of illustration only and are not intended to define the limits of the invention. Further, the drawings merely illustrate a preferred embodiment incorporating the features of this invention.

DETAILED DESCRIPTION OF THE PREFERRED EMBODIMENT

Figure 1:
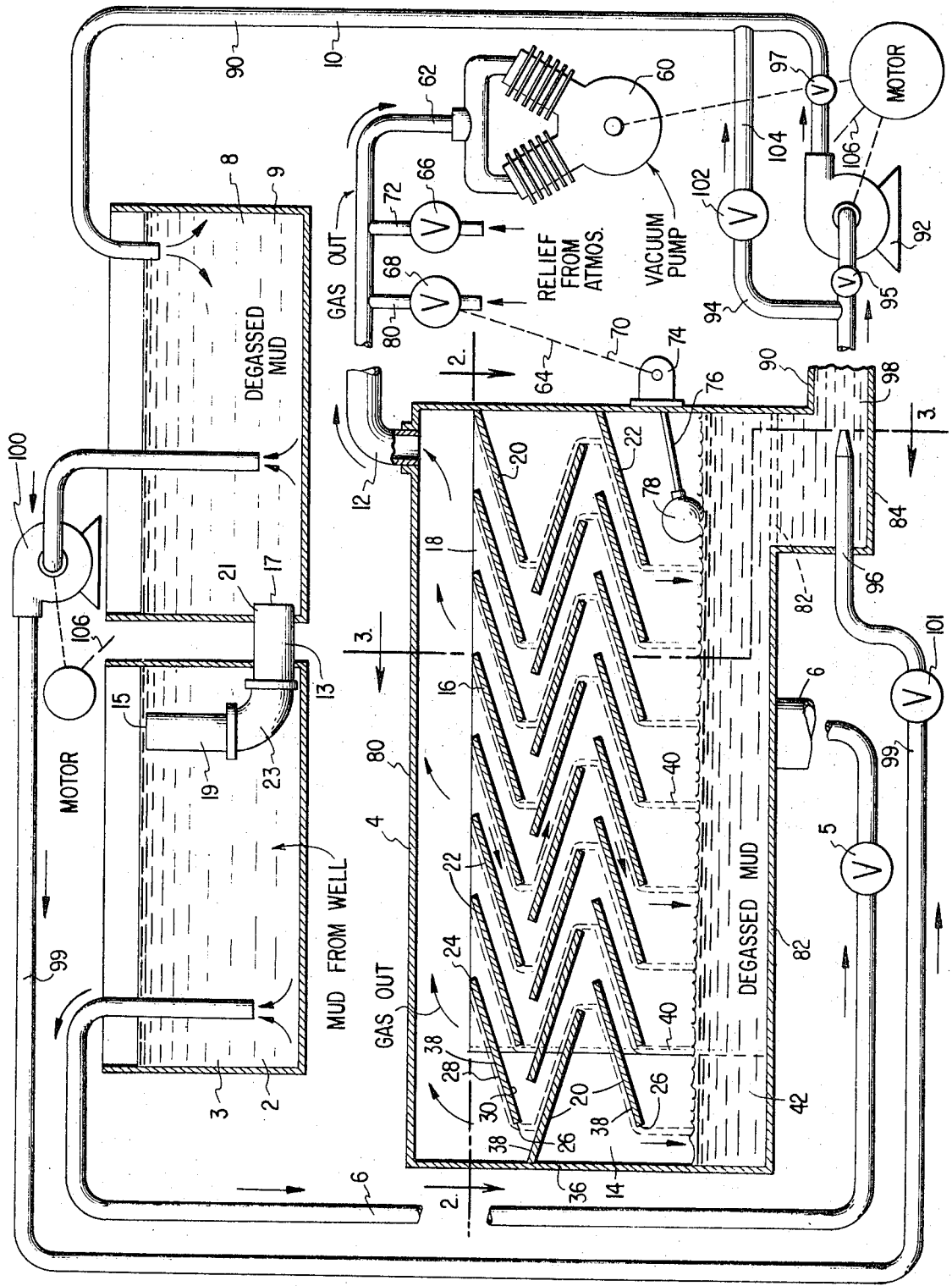
FIG. 1 is a partially schematic view of a system for the degassification of drilling mud embodying the features of this invention and including a transverse vertical section through a mud degassing tank.

Referring to FIG. 1, a system for use in the degassification of drilling mud designated by the reference numeral 1 is illustrated and encompasses the features of this invention. This drilling mud degassification system 1 includes a gas-laden mud tank 2 defining a gas-laden mud basin 3 for receiving mud from the well bore, a degassing tank 4 for removing entrapped gas from the drilling mud and a gas-laden mud inlet conduit 6 coupling the mud tank 2 and the degassing tank 4. In addition, the illustrated system 1 includes a degassed mud tank 8 defining a degassed mud basin 9 with a degassed mud outlet assembly 10 coupling the degassing tank 4 and degassed mud tank 8 to provide a flow path for degassed mud from the degassing tank 4 to the mud tank 8. The degassing tank 4 also has a gas outlet assembly 12 operatively coupled thereto for providing a controlled reduced pressure within the interior chamber 14 of the degassing tank 4. A shut-off valve 5 is provided in conduit 6 such that the degassing tank 4 may be sealed off from the gas-laden mud tank 2 when the degassing tank 4 is not in operation to prevent mud from being siphoned into tank 4 if the tank inlet is positioned at a lower elevation than the mud level in tank 2.

An equalizer means or tube 13 is provided and is mounted by suitable means to tanks 2 and 8 for providing a mud flow path therebetween. In this manner, a flow of degassed mud may be created from the degassed mud tank 8 to the gas-laden mud tank 2 when desired. The tube 13 defines openings 15 and 17 in communication with the basins 3 and 9 respectively. In order to control the flow of mud from tank 8 to tank 2, the elevation of the opening 15 may be selectively varied. Thus, dependent upon the head of mud in tank 8 and the selected elevational positioning of opening 15, a flow of mud may be effected through opening 15.

In the illustrated embodiment, the tube 13 is comprised of a pair of conduits or sleeves 19 and 21 and an elbow fitting 23. Conduit 21, which defines opening 17, extends between basins 3 and 9 and is threadingly engaged to elbow 23 by mating threaded portions on each of the elbow 23 and the conduit 21. Conduit 19, which defines opening 15, is mounted on the opposed end of the elbow 23 as by threaded engagement. As the conduit 21 is threadingly engaged to the elbow 23, elbow 23 and thus conduit 19 may be rotated through a plane normal to conduit 21 to thereby vary the elevation of the opening 15 in the basin 3. If the opening 15 is positioned beneath the level of mud in the tank 8, flow of degassed mud into the tank 2 will commence. As the density of the degassed mud may be substantially greater than that of the gas cut or gas-laden mud, a column of degassed mud will displace a significantly higher column of gas cut mud. Thus, flow of degassed mud into basin 3 is facilitated even where the level of gas cut mud is above the elevational position of the opening 15. The gas cut mud is thereby diluted by mixing with degassed mud, such dilution allowing for the withdrawal of a greater percentage of gas from the gas cut mud.

The degassing tank 4 includes a new and improved baffle means or structure 16 operatively mounted within the interior chamber 14 of the tank 2. The baffle structure 16 provides a maximum distribution of the gas-laden drilling mud into extremely thin layers so that the environment of reduced pressure within the tank 4 can act upon the mud for removal of entrapped gas from the drilling mud. In the preferred embodiment, a pair of baffle structures 16 are provided and positioned along a pair of longitudinally extending, spaced, parallel axes located on opposed sides of an elongated container 18. The container 18 provides a flow dividing or distribution means for gas-laden mud entering the degassing tank 4. It is contemplated, however, that a single baffle structure 16 could be employed in combination with some other type of gas-laden mud distributing means while still obtaining the benefit of providing for a maximum spreading of the gas-laden mud with minimum size requirements for the degassing tank 4.

Figure 2:
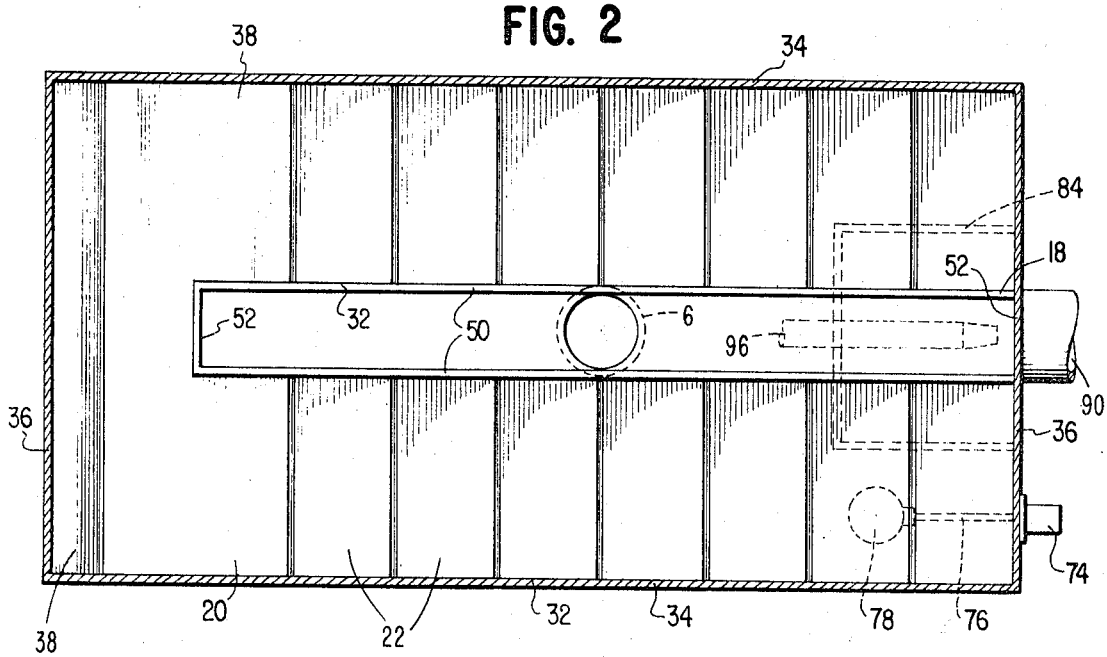
FIG. 2 is a horizontal sectional view taken on line 2—2 through the mud degassing tank shown in FIG. 1 and illustrating, in plain view, the baffle arrangement employed within said degassing tank and the elongated mud overflow container.

Each of the baffle structures 16 as illustrated is comprised of a plurality of baffle layers 20 providing a vertically stacked baffle arrangement on each of the opposed sides of the elongated container 18. The individual baffle layers 20 are comprised of a plurality of inclined baffle plates 22. As illustrated, the inclined plates 22 are substantially rectangular and define upper and lower edges 24 and 26 respectfully and upper and lower surfaces 28 and 30 respectively. In addition, the illustrated baffle plates 22 include opposed end edges 32 which are mounted to the side walls 34 of the tank 4 and the elongated container 18 by suitable means such as welding. If the elongated container 18 is terminated short of the end walls 36 of the degassing tank 4 as illustrated in FIG. 2, the endmost baffle plates designated by the reference numeral 38 may be extended in order to utilize all of the space within the interior chamber 14 of the tank 4. Thus, the endmost plate 38 extends around the end of the elongated container 18 and may be comprised of a pair of plates 20 joined together or may simply be comprised of a single plate which extends completely across the tank 4 between the side walls 34.

The baffle plates 22 within each of the baffle layers 20 are inclined relative to the horizontal and disposed in closely spaced and overlying relation with their upper edges 24 overlying the upper surfaces 28 of the next adjacent plate 22. In the illustrated embodiment, the upper edges 24 and lower edges 26 of the plates 22 of an individual baffle layer 20 are disposed in a pair of vertically spaced horizontal planes respectively. The upper and lower edges 24 and 26 of the plates 22 are spaced apart, respectively, from the upper and lower edges of the other plates 22 within a layer 20. In the illustrated embodiment, these edges 24 and 26 are substantially equally spaced throughout the length of the plates 22 in such a manner that the plates 22 of each of the layers 20 are disposed in a substantially parallel relation to one another.

As illustrated in FIG. 1, adjacent layers 20 of the baffle plates 22 are reversely inclined relative to the horizontal. In this manner, the lower edges 26 of the plates 22 of an overlying layer 20 are positioned in overlying relation to the upper surfaces 28 of the plates 22 of the underlying baffle layer 20. Thus, gas-laden drilling mud flows by gravity down the upper surfaces 28 of the plates 22 of a first baffle layer 20 and falls in descending curtains from the lower edges 26 of said plates 22 and onto the upper surfaces 28 of the plates 22 of the next adjacent lower baffle layer 20 and thence throughout the entire baffle structure 16 in a circuitous path. Eventually the mud falls from the lower edges 26 of the plates 22 of the lowermost baffle layer 20 in a plurality of descending curtains 40 into a mud receiving area 42 in the lowermost portion of a degassing tank 4.

In the illustrated embodiment, the degassing tank 4 has a substantially horizontal, longitudinal axis. The individual plates 22 of the baffle structure 16 extend transversely of the longitudinal axis of the tank 4 and are spaced longitudinally of said axis. Conveniently, by lengthening the tank 4 by an amount equal only to the spacing between the respective plates 22, a new flow path can be added through the tank 4 thereby materially increasing the surface area over which the gas-laden mud is distributed with only a minimum increase in size of the degassing tank 4. While it is preferable to provide a plurality of baffle layers 20 in order to obtain the maximum distribution of the gas-laden mud and retain the mud in thin layers for a maximum period of time, it is contemplated that, where desired, a single baffle layer 20 could be employed. It is further contemplated that the baffle plates 22 could extend completely across the width of the degassing tank 4 with some means other than the elongated container 18 employed for distributing the gas-laden mud on the upper surfaces 28 of the uppermost layer 20 of the baffle structure 16. Particularly desirable results are obtained, however, by the use of elongated container 18 as an even flow of gas-laden mud is distributed to all of the baffle plates 22 in the uppermost baffle layer 20.

The elongated container 18 is comprised of side walls 50, end walls 52, and a bottom wall 54. The side and end walls 50 and 52 respectively are relatively high in order to provide a deep, open top container 18. Gas-laden mud is provided at the lower portion 55 of the elongated container 18 uniformly filling the container and creating an even flow of mud over the end and side walls 50 and 52 respectively.

The gas outlet assembly 12, illustrated in FIG. 1, includes a vacuum pump 60, a gas outlet conduit 62, coupling the pump 60 to the interior chamber 14 of the degassing tank 4 and a pressure control assembly 64. The control assembly includes a manual valve 66 and a float and relief valve group 70. The manual valve 66 is operatively coupled to the gas outlet conduit 62 by a flow line 72 for manual venting of the gas outlet conduit 62 to the atmosphere.

The float and relief valve group 70 is comprised of a float actuator 74 mounted on the degassing tank 4 and including a float arm 76 and a float 78 positioned in the degassing mud receiving area 42 of the chamber 14 of degassing tank 4. The float 78 moves the arm 76 about an arcuate path responsively to the variations in the level of the degassed mud in the degassed mud receiving area 42. The float actuator 74 is operatively connected to the relief valve 68 which serves to vent the gas outlet conduit 62 through a relief line 80 when the degassed mud reaches a predetermined level within the mud receiving area 42. As the mud then recedes to a second predetermined lower level, the actuator 74 closes the valve 68 to allow the vacuum pump 60 to draw from the interior chamber 14 and thereby reduce the pressure in chamber 14. It is particularly desirable to employ a reciprocating vacuum pump in this environment for effectively and efficiently providing a chamber 14 of reduced pressure, although a centrifugal pump may be utilized.

The degassing tank 4 as illustrated is rectangular, having top and bottom walls 80 and 82, side walls 34, and end walls 36. An ejector pot 84, which is positioned beneath the bottom wall 82, is in communication with the degassed mud receiving area 42. The ejector pot 84 is operatively coupled to the degassed mud tank 8 by the mud outlet assembly 10 which includes a degassed mud outlet conduit 90, a centrifugal pump 92 operatively coupled to the outlet conduit 90, a bypass assembly 94, and an ejector 96. The outlet conduit 90 is operatively coupled through an outlet 98 to the ejector pot 84 to enable a flow of mud from the degassed mud receiving area 42 through the ejector pot 84, and the outlet conduit 90 to the degassed mud tank 8.

The ejector 96 includes a flow line 99 from the tank 2 into the ejector pot 84, a centrifugal pump 100 operatively coupled in the flow line 99 for drawing degassed mud from the degassed mud tank 8 and ejecting this mud under pressure into the ejector pot 84 in the direction of the outlet 98. In this manner, mud in the ejector pot 84 is drawn with the flow of degassed mud from the ejector 96 and both are pushed through the outlet conduit 90 to the degassed mud tank 8. A valve 101 is provided in flow line 99 to regulate the flow rate therethrough and subsequently the flow rate of degassed mud into the ejector pot 84.

The ejector 96 may be used separately from, or in combination with, the centrifugal pump 92. When the ejector 96 is used in combination with the pump 92, it is employed for maintaining the centrifugal pump 92 in a constantly primed condition. Where particularly large qualities of entrapped gas are encountered, there is a tendency for centrifugal pumps to cavitate. The pressure imposed by the ejector 96 in the outlet conduit 90 prevents such cavitation. It is also possible to employ the centrifugal pump 92 and the ejector 96 separately. In such an instance, the ejector 96 can be employed as a standby to be used in combination with the bypass 94 for pumping mud from the degassing tank 4 upon failure of the centrifugal pump 92. A valve 102 in the bypass assembly 94 is cooperatively coupled to the centrifugal pump 92 to open upon failure of the pump 92. As the ejector 96 may not be in continuous use in combination with the centrifugal pump, a control circuit 106 is provided between pumps 92 and 100 to start pump 100 when pump 92 fails. Valves 95 and 97 are operatively mounted in the conduit 90 on the inlet and discharge sides respectively of the pump 92 to enable the pump 92 to be isolated for repairs.

Figure 3:
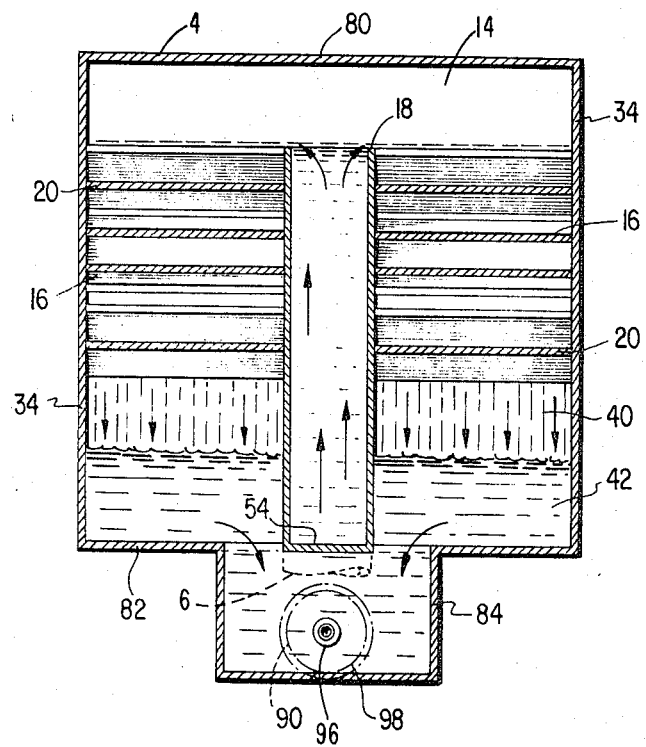
FIG. 3 is a vertical sectional view taken on line 3—3 of FIG. 1 showing the elongated container for distributing the gas-laden mud with the baffle structures disposed on opposed sides of said container.

In operation, the gas-laden mud is drawn from the tank 2 through the inlet conduit 6 to the interior chamber 14 of the degassing tank 4 by the vacuum drawn through the gas outlet assembly 12. As illustrated in FIG. 3, the gas-laden mud enters the degassing tank 4 through an inlet in the bottom wall 54 of the elongated container 18. The gas-laden mud fills the container 18, rising uniformly through the relatively deep container and overflows the upper edges of the side walls 50 and end wall 52 and onto the upper surfaces 28 of the uppermost layer 20 of baffle plates 22. This relatively even overflow of gas-laden mud insures a predictable and uniform distribution of mud to the baffle structures 16.

As shown in FIG. 1, the gas-laden drilling mud so distributed to the plates 22 spreads into a thin film and flows downwardly over the inclined upper surfaces 28. The drilling mud then falls from the lower edges 26 of the plates 22 and onto the upper surfaces 28 of the respective plates 22 in the underlying baffle layer 20. In this manner, the mud continues along a circuitous path through the baffle structures 16 finally falling in descending curtains 40 from the lower edges 26 of the plates 22 into the mud receiving area 42. As the mud moves through the baffle structures 16, it is spread into a relatively thin layer or film and entrapped gas is removed therefrom. By this new and novel baffle arrangement, maximum distribution of the mud is attained within a minimum of space with the flexibility of allowing for a significant increase in the available area for mud distribution with a minimum increase in space required.

The degassed mud may be withdrawn from the receiving area 42 by the combined pumping action of the ejector 96 and the centrifugal pump 92. The ejector 96 draws degassed mud from the degassed mud tank 8 through conduit 99 by the driving force of the centrifugal pump 100. This degassed mud is ejected into the ejector pot 84 in the direction of the outlet 98 thereby drawing mud from the ejector pot 84 and the mud receiving area 42 into the outlet 98 and pushing the mud through the outlet conduit 90, thus maintaining the centrifugal pump 92 in a constantly primed condition.

The ejector 96 may also be utilized as an auxiliary pump in case of failure of the centrifugal pump 92. In this instance, the bypass assembly 94 is employed for circumventing the centrifugal pump 92. A bypass valve 102 is operatively coupled in the bypass conduit 104 and is opened and closed responsively to failure in starting respectively of the centrifugal pump 92. Thus, the ejector 96 is capable of driving the degassed mud from the ejector pot 84 through the conduit 104 of the bypass 94 and into conduit 90 for ultimate disposition in the degassed mud tank 8.

As the gas-laden mud is drawn into the interior chamber 14 of the tank 4 by the vacuum pump 60, the flow of gas-laden mud is controllable by regulation of pressure levels within the tank 4. It has been found extremely advantageous to control the pressure level within the tank 4 by venting the outlet conduit 62 directly to the atmosphere as opposed to a direct venting of the tank 4. Such direct tank venting tends to increase the possibility of combustion.

The venting of the outlet conduit 62 to the atmosphere is controlled by a float valve actuator 74 having a float 78 disposed within the degassed mud receiving area 42. As the mud rises to a predetermined level, the actuator 74 opens valve 68 allowing the vacuum pump 60 to draw air through the venting conduit 80 and into the outlet conduit 62, increasing the pressure in the tank 4 and reducing the flow of mud flow into tank 4. This reduction of mud inflow allows the mud evacuation means to reduce the level of mud within the degassed mud receiving area 42. When the mud within the receiving area 42 reaches a second, lower, predetermined level, the float actuator 74 closes valve 68, causing the vacuum pump 60 to draw from the interior chamber 14 of the tank 4 again decreasing the pressure therein and increasing the flow of gas-laden mud to the inlet line 6.

It is to be understood that the form of the invention herein shown and described is to be taken as a preferred example of the invention and various changes and modifications in the arrangement of parts and the interconnection of components may be resorted to without departing from the spirit of the invention or the scope of the appended claims. All such variations and modifications which come within the spirit and scope of the appended claims are intended to be included herein as fully and completely as if they had been specifically illustrated, described, and claimed. Thus, the modifications specifically disclosed are exemplary only and are not intended to be limiting on the scope of the invention. The scope of the invention is defined by the following claims.

What is claimed is:

1. An apparatus for the degassification of drilling muds comprising:
    (a) an elongated tank having a substantially horizontal longitudinal axis,
    (b) means coupled to said tank for drawing a vacuum in said tank,
    (c) an elongated container mounted in said tank and having a substantially horizontal axis generally parallel to said tank axis, said container having upper and lower portions, inlet means positions at the lower portion of said container to provide gas-laden drilling mud to said container in such a manner that the level of gas-laden mud rises substantially evenly throughout said container, the upper portion of said container providing an elongated wall having a horizontal edge extending in the direction of said container axis for permitting a uniform overflow of mud from said container across said edge,
    (d) baffle means comprising a plurality of baffle plates mounted in said tank at locations spaced longitudinally of said tank axis and extending transversely thereof outwardly from said elongated container wall, said baffle plates being inclined downwardly from said container edge longitudinally of said container axis to define a plurality of upper baffle surfaces in vertically overlapping relationship between adjoining baffle plates so that the mud overflowing said container edge is split into separate streams by said baffles and flows downwardly in thin layers on said upper baffle surfaces.

2. An apparatus as recited in claim 1 wherein said container is centrally mounted in said tank and has a pair of said elongated walls on opposite sides of said container axis to define a pair of said horizontal edges, with a pair of said baffle means extending transversely in opposite directions from said elongated walls.

3. An apparatus as recited in claim 1 which includes a plurality of said baffle means arranged in a plurality of vertical layers with the baffle plates in each layer below the top layer being reversely inclined relative to the baffle plates in the next higher layer, and with the baffle plates in each layer above the lower layer having lower edges overlying the upper baffle surfaces of respective baffle plates in the next lower layer.

4. An apparatus as recited in claim 2 which includes a plurality of said baffle means arranged in a plurality of vertical layers with the baffle plates in each layer below the top layer being reversely inclined relative to the baffle plates in the next higher layer, and with the baffle plates in each layer above the lower layer having lower edges overlying the upper baffle surfaces of respective baffle plates in the next lower layer.

5. An apparatus for the degassification of drilling mud as recited in claim 1 further comprising:
  (a) a gas-laden mud tank defining a gas-laden mud basin for receipt of mud from the well bore, said basin being operatively coupled to the inlet means of said container;
  (b) a degassed mud tank defining a degassed mud basin operatively coupled to said elongated tank to receive the degassed mud therefrom and to retain said mud for ultimate transfer back to the well bore;
  (c) an equalizer means for maintaining the level of mud in the mud basins at desired levels, said equalizer means including first and second means defining first and second openings respectively, said first opening being located in communication with the lower portion of said degassed mud basin and said second opening being located in communication with said gas-laden mud basin, said means defining said second opening being selectively movable to position said opening at desired elevations in said gas-laden mud basin.

6. A combination as recited in claim 5 wherein said equalizer means is comprised of a first conduit operatively associated with said mud basins and defining a flow passage therebetween, an elbow fitting threadingly engaged on said first conduit, said fitting including a second conduit extending outwardly therefrom on the opposite end of said fitting from said first conduit, said second conduit defining said second opening, said fitting being rotatable relative to said first conduit to vary the angular relation of said second conduit to the horizontal and thereby vary the elevation of the second opening in said gas-laden mud basin.

7. An apparatus as recited in claim 3 wherein said tank has a mud receiving area at the lowermost portion thereof for receipt of drilling mud from the lower edge of the lowermost baffle layer and an ejector pot positioned beneath and in communication with said mud receiving area, said apparatus further including mud outlet means in communication with said ejector pot and means in said ejector pot for ejecting degassed mud through said outlet means to draw mud from said receiving area and push said mud through said outlet means.

8. An apparatus as recited in claim 7 wherein said means for ejecting degassed mud from said ejector pot includes an ejector for ejecting degassed mud into said ejector pot in the direction of said outlet means, creating a flow of degassed mud to and through said outlet means.

9. An apparatus as recited in claim 8 wherein the outlet means from said ejector pot includes a centrifugal pump means operatively coupled therein for moving mud from said ejector pot.

10. An apparatus as recited in claim 9 wherein said outlet means from said ejector pot includes a bypass means from the inlet to the outlet of said centrifugal pump means with valve means in said bypass means for opening and closing said bypass means to permit the flow of degassed mud through said outlet line and around said centrifugal pump means.

11. An apparatus as recited in claim 7 including a float valve means operatively mounted to said tank and positioned in said mud receiving area, said float valve means being responsive to change of level in said receiving area and wherein said vacuum drawing means includes a vacuum pump and a gas outlet conduit connecting said pump to said tank with a venting valve means in said gas outlet conduit operatively coupled to said float valve means for venting said gas outlet conduit to the atmosphere when the level of the mud in the mud receiving area reaches a selected level.

12. An apparatus as recited in claim 11 wherein said vacuum pump means is comprised of a reciprocating vacuum pump.

References Cited

UNITED STATES PATENTS

| 1,038,119 | 9/1912 | Greene | 137—579X |
| 2,195,898 | 4/1940 | Newton | 55—190X |
| 2,374,232 | 4/1945 | Pfeiffer et al. | 55—189X |
| 2,717,458 | 9/1955 | Shabaker | 34—171X |
| 2,748,884 | 6/1956 | Erwin | 55—193 |
| 2,869,673 | 1/1959 | Erwin | 55—168X |
| 3,314,219 | 4/1967 | Griffin et al. | 55—167 |

FOREIGN PATENTS

| 392,044 | 5/1933 | Great Britain | 55—193 |

REUBEN FRIEDMAN, Primary Examiner

R. W. BURKS, Assistant Examiner

U.S. Cl. X.R.

55—193